United States Patent
Jeon

(10) Patent No.: US 9,758,057 B2
(45) Date of Patent: Sep. 12, 2017

(54) DRAIN TUBE DEVICE OF MUFFLER FOR FUEL CELL VEHICLE

(71) Applicant: Hyundai Motor Company, Seoul (KR)

(72) Inventor: Soo Il Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 119 days.

(21) Appl. No.: 14/862,872

(22) Filed: Sep. 23, 2015

(65) Prior Publication Data

US 2016/0336611 A1    Nov. 17, 2016

(30) Foreign Application Priority Data

May 14, 2015  (KR) ........................ 10-2015-0067021

(51) Int. Cl.
| | |
|---|---|
| *F16T 1/34* | (2006.01) |
| *B60L 11/18* | (2006.01) |
| *H01M 8/0662* | (2016.01) |
| *H01M 8/04119* | (2016.01) |

(52) U.S. Cl.
CPC ..... *B60L 11/1883* (2013.01); *H01M 8/04164* (2013.01); *H01M 8/0662* (2013.01); *H01M 2250/20* (2013.01); *Y02T 90/32* (2013.01); *Y10T 137/3021* (2015.04)

(58) Field of Classification Search
CPC ......... Y10T 137/3021; Y10T 137/3031; Y10T 137/3003; H01M 8/04164; H01M 8/0662; H01M 2250/20; B60L 11/1883
USPC ........ 137/171, 177, 180; 181/212, 227, 228, 181/237
See application file for complete search history.

(56) References Cited

U.S. PATENT DOCUMENTS

| | | | |
|---|---|---|---|
| 5,429,150 A * | 7/1995 | Siefers, Jr. ................ | F16T 1/34 137/177 |
| 8,181,737 B2 * | 5/2012 | Lee ........................... | F01N 1/00 181/227 |
| 8,439,156 B1 | 5/2013 | Abram | |

(Continued)

FOREIGN PATENT DOCUMENTS

| | | |
|---|---|---|
| JP | H08100626 A | 4/1996 |
| JP | 2008-130484 A | 6/2008 |

(Continued)

OTHER PUBLICATIONS

Machine Translation of KR20100010580A from EPO website retrieved Mar. 17, 2017.*

*Primary Examiner* — Jessica Cahill
(74) *Attorney, Agent, or Firm* — Mintz Levin Cohn Ferris Glovsky and Popeo, P.C.; Peter F. Corless

(57) ABSTRACT

A drain tube device of a muffler for a fuel cell vehicle includes: the muffler included in an exhaust pipe of the fuel cell vehicle and having a front end part to which blower air is introduced and a rear end part from which the blower air is discharged; a drain tube having a drain hole disposed between the front end part and the rear end part of the muffler to downwardly discharge the blower air; and a hole cover part mounted in the drain hole to block a hydrogen discharge of the blower air and discharge only condensate water. The drain tube device maintains functioning of the muffler while discharging the condensate water and smoothing a flow of the blower air through the hole cover part mounted in the drain hole upon starting the vehicle.

10 Claims, 8 Drawing Sheets

(56) References Cited

U.S. PATENT DOCUMENTS

| | | | | |
|---|---|---|---|---|
| 2007/0080020 A1* | 4/2007 | Emmett | ............... | F01N 1/165 |
| | | | | 181/237 |
| 2009/0025566 A1* | 1/2009 | Son | ............... | H01M 8/04164 |
| | | | | 96/397 |
| 2010/0279191 A1* | 11/2010 | Matsuura | ............ | H01M 8/0662 |
| | | | | 429/443 |

FOREIGN PATENT DOCUMENTS

| KR | 10-2006-0099643 | | 9/2006 |
|---|---|---|---|
| KR | 20100010580 A | * | 2/2010 |
| KR | 10-1113643 | | 2/2012 |
| KR | 10-1464658 | | 11/2014 |
| KR | 10-2016-0040748 A | | 4/2016 |

\* cited by examiner

DRAIN TUBE DEVICE OF MUFFLER FOR FUEL CELL VEHICLE

CROSS-REFERENCE TO RELATED APPLICATION

This application claims under 35 U.S.C. §119(a) the benefit of Korean Patent Application No. 10-2015-0067021, filed on May 14, 2015 in the Korean Intellectual Property Office, the entire contents of which are incorporated herein by reference.

BACKGROUND (a) Technical Field

The present invention relates to a drain tube device of a muffler for a fuel cell vehicle, and more particularly, to a drain tube device for easily discharging blower air and condensate water through a drain formed in the muffler at the time of starting the vehicle.

(b) Description of the Related Art

In general, a fuel cell, which is a kind of generator that generates electrical energy by an electrochemical reaction of fuel (hydrogen) and oxidizing agent (oxygen), has been studied and developed as a power source due to an increase in demand for alternative power sources, and the fuel cell is widely used in fields such as a mobile power supply of a portable electronic device, a transport power supply of a vehicle, a distribution power supply of a building, etc.

The fuel cell includes a stack generating electrical energy, a fuel supplying system supplying the fuel (hydrogen) to the stack, an air supplying system supplying air to the stack, and related components.

Meanwhile, the fuel cell is installed with an exhaust system, and the exhaust system is configured to exhaust moisture generated at the time of a generation reaction of the stack, non-reacted hydrogen and air. The exhaust system may generate high frequency noise such as high speed air flow sound, and particularly, since a fuel cell vehicle using a fuel cell system as a power source is very sensitive to a noise problem, an exhaust muffler for reducing noise is mounted in the fuel cell system.

The exhaust muffler embeds a sound absorbing material such as a glass wool, or the like for reducing noise, and also embeds a hydrogen dilution mechanism diluting exhausted hydrogen to a predetermined concentration or less.

Meanwhile, since an exhaust muffler according to the related art includes the sound absorbing material having a very high hydrous performance, the exhaust muffler easily absorbs moisture. As a result, the exhaust muffler may not consistently maintain predetermined sound absorbing capability, and consequently, acoustic performance thereof may decrease. In particular, the exhaust of the fuel cell contains a large amount of generated moisture. The moisture is condensed in the muffler, or water condensed in an upper exhaust system is introduced into the muffler, which often causes water to be collected in a bottom of the muffler. In this case, since the sound absorbing material filled in the bottom of the muffler absorbs and contains the water, the sound absorbing material may not maintain sound absorbing capability, thereby decreasing acoustic performance of the muffler. In addition, in the case of the fuel cell vehicle in which performance at a low temperature is critical, the condensed or collected moisture may be frozen in an environmental condition below a temperature of 0° C., thereby causing problems such as a decrease in exhaust performance.

SUMMARY

An aspect of the present invention provides a drain tube device of a muffler for a fuel cell vehicle, and more particularly, a drain tube device for easily discharging blower air and condensate water through a drain formed in the muffler at the time of starting the vehicle.

According to an exemplary embodiment of the present invention, a drain tube device of a muffler for a fuel cell vehicle includes: the muffler arranged in an exhaust pipe of the fuel cell vehicle to reduce noise and having a front end part to which blower air is introduced and a rear end part from which the blower air is discharged; a drain tube having a drain hole formed to be disposed between the front end part and the rear end part of the muffler so as to downwardly discharge the blower air; and a hole cover part configured to be mounted in the drain hole to block a hydrogen discharge of the blower air and discharge only condensate water.

The hole cover part may include a cover of a pipe shape inserted into the drain hole and formed to downwardly protrude; and a semipermeable membrane provided in a lower portion of the cover to block the hydrogen discharge and to discharge only the condensate water.

The lower portion of the cover and the semipermeable membrane may have a sealing part formed therebetween, the sealing part formed of a silicon material in order to maintain airtightness.

A spring hinge plate may be included in the lower portion of the cover to be opened and closed, such that the spring hinge plate can be opened together with the semipermeable membrane when revolutions per minute (RPM) of the blower air is increased, to allow the condensate water collected in the hole cover part to be discharged.

A situation in which the collected condensate water is frozen may be prevented in advance, e.g., by allowing the spring hinge plate to be opened by a weight of the collected condensate water and to discharge the collected condensate water.

The spring hinge plate may be automatically rotated by elastic force when the RPM of the blower air is decreased, to allow the lower portion of the cover to be closed.

A discharge hole for discharging the condensate water may be formed at the center of the spring hinge plate.

A plurality of discharge holes of the spring hinge plate may be provided.

An inner bottom of the drain tube may have a slope of a predetermined angle toward the drain hole so that the condensate water is easily discharged through the hole cover part.

A diameter of the rear end part of the muffler may be formed to be greater than that of the front end part thereof in order to maximize a flow of the blower air in the muffler.

An exit side of the front end part and an entrance side of the rear end part of the muffler may be multi-staged to form a step in order to maximize the flow of the blower air in the muffler.

According to another exemplary embodiment of the present invention, a drain tube device of a muffler for a fuel cell vehicle includes: the muffler arranged in an exhaust pipe of the fuel cell vehicle so as to discharge blower air introduced into a front end part thereof to a rear end part, the rear end part having a diameter greater than that of the front end part; a drain tube configured to connect the front end part and the rear end part of the muffler, the drain tube having a drain hole formed to downwardly discharge the blower air, and have a slope of a predetermined angle toward the drain hole formed on an inner bottom thereof; and a hole cover part configured to be mounted in the drain hole to block a hydrogen discharge of the blower air and discharge only condensate water, wherein the hole cover part includes: a cover of a pipe shape inserted into the drain hole and formed to downwardly protrude; a semipermeable membrane provided in a lower portion of the cover to block the hydrogen discharge and to discharge only the condensate water; and a spring hinge plate included in the lower portion of the cover, the spring hinge plate having a discharge hole formed so as to be opened together with the semipermeable membrane when revolutions per minute (RPM) of the blower air is increased, to allow the condensate water collected in the hole cover part to be discharged.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
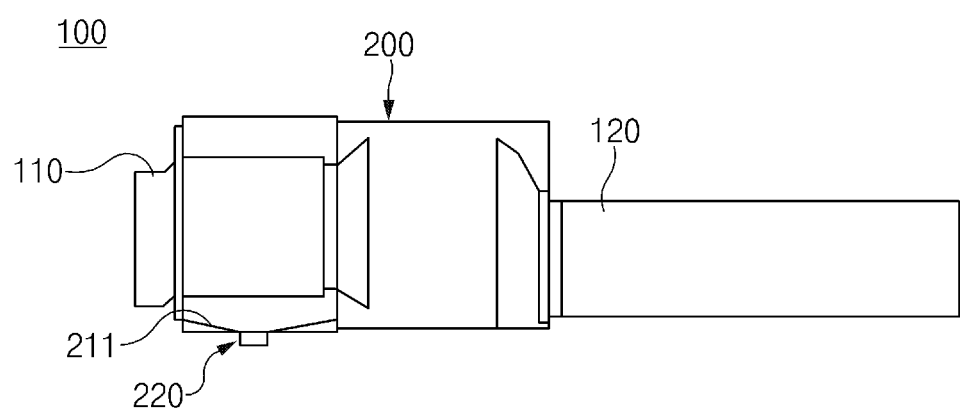
FIG. 1 is a schematic diagram showing a drain tube device of a muffler for a fuel cell vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present invention will be described in detail with reference to the accompanying drawings.

A drain tube device of a muffler for a fuel cell vehicle according to the present invention includes a muffler 100 provided in the fuel cell vehicle to introduce and discharge blower air, a drain tube 200 connecting a front end part 110 and a rear end part 120 of the muffler 100 and having a drain hole 210 formed therein, and a hole cover part 220 mounted in the drain hole 210 to discharge condensate water, as illustrated in FIGS. 1 to 4.

Figure 2:
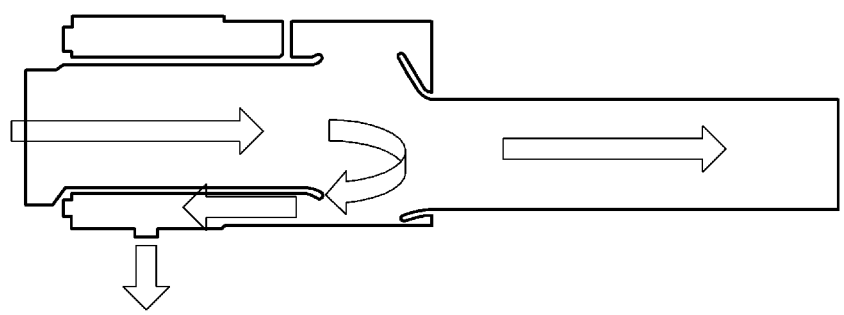
FIG. 2 is a cross-sectional view showing a flow state of blower air by the drain tube device of FIG. 1 according to the exemplary embodiment of the present invention.
Figure 3:
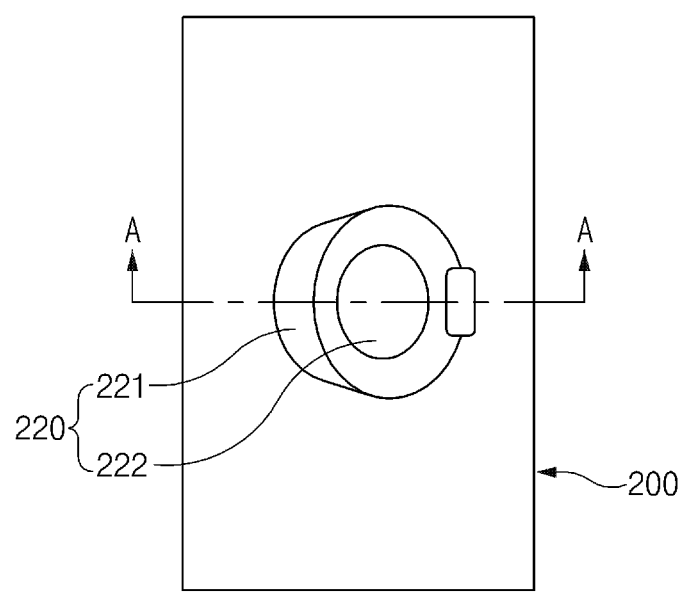
FIG. 3 is a schematic diagram showing a hole cover part mounted in a drain hole in the drain tube device of FIG. 1 according to the exemplary embodiment of the present invention.

As illustrated in FIGS. 1 and 2, the muffler 100, which is included in an exhaust pipe of the fuel cell vehicle to reduce noise, includes the front end part 110 and the rear end part 120, when the blower air is introduced to the front end part 110 and is discharged from the rear end part 120.

The drain tube 200 is disposed between the front end part 110 and the rear end part 120 of the muffler 100 to connect the front end part 110 and the rear end part 120 of the muffler 100.

In this case, the drain hole 210 for discharging the blower air is formed in a lower portion of the drain tube 200.

In particular, air, which is not discharged to the rear end part 120, of the blower air discharged to the rear end part 120 through the front end part 110 of the muffler 100 may be discharged through the drain hole 210 formed in the lower portion of the drain tube 200.

As shown in FIGS. 1 to 4, the hole cover part 220 may be mounted in the drain hole 210 to block hydrogen discharge of the discharged blower air and to discharge only condensate water.

In this case, the hole cover part 220 includes a cover 221 inserted into the drain hole 210, and a semipermeable membrane 222 included in the cover 221.

The cover 221 preferably is formed in a pipe shape, so as to be inserted into the drain hole 210 and downwardly protrude.

The semipermeable membrane 222 is provided in a lower portion of the cover 221 to block the hydrogen discharge and to discharge only the condensate water.

In this case, a sealing part 223 formed of a silicon material may be preferably formed between the lower portion of the cover 221 and the semipermeable membrane 222 in order to maintain airtightness.

In addition, a spring hinge plate 224 is included in the lower portion of the cover 221, the spring hinge plate 224 configured to be opened and closed, when the spring hinge plate 224 is opened together with the semipermeable membrane 222 when revolutions per minute (RPM) of the blower air is increased, to allow the condensate water collected in the hole cover part 220 to be discharged. Further, a situation in which the collected condensate water is frozen may be prevented in advance by allowing the spring hinge plate 224 to be opened by a weight of the collected condensate water and to discharge the collected condensate water.

Meanwhile, the spring hinge plate 224 is automatically rotated by elastic force when the RPM of the blower air is decreased, to allow the lower portion of the cover 221 to be closed.

Figure 5:
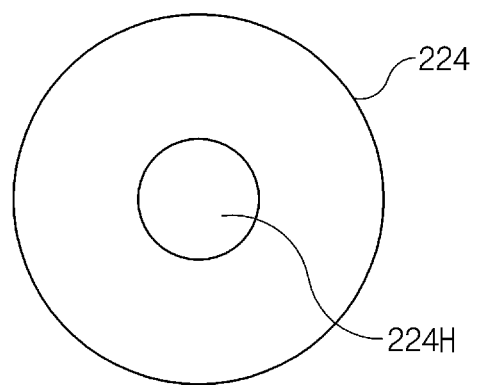
FIG. 5 is a schematic diagram showing a semipermeable membrane of the hole cover part in the drain tube device of FIG. 1 according to the exemplary embodiment of the present invention.

As illustrated in FIG. 5, a discharge hole 224H for discharging the condensate water is formed at the center of the spring hinge plate 224, thereby making it possible to easily discharge the condensate water.

Figure 6A:
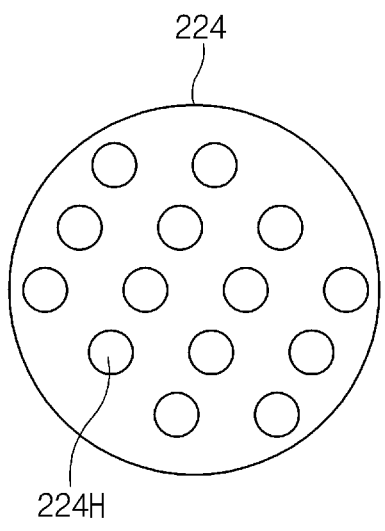
FIGS. 6A and 6B are other examples of the semipermeable membrane of the hole cover part in the drain tube device of FIG. 1 according to the exemplary embodiment of the present invention.
Figure 6B:
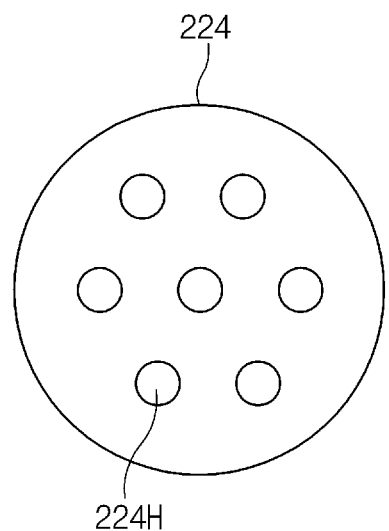

In addition, a plurality of discharge holes 224H of the spring hinge plate 224 may be formed, as illustrated in FIGS. 6A and 6B, thereby making it possible to improve discharge performance of the condensate water.

Figure 4A:
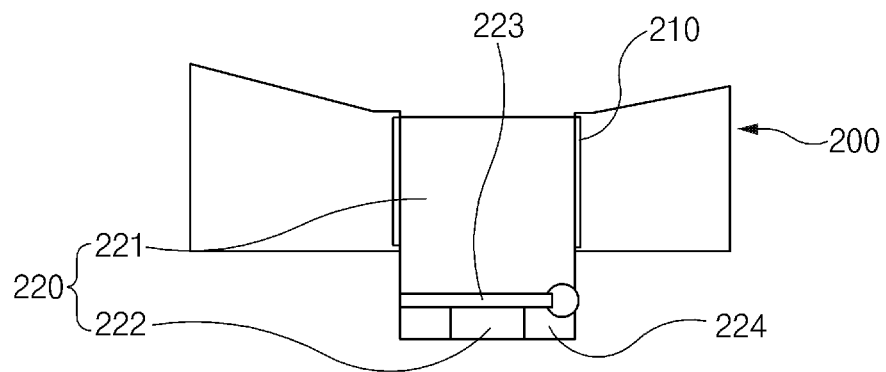
FIGS. 4A and 4B are cross-sectional views showing open and closed states, respectively, of the hole cover part mounted in the drain hole in the drain tube device of FIG. 1 according to the exemplary embodiment of the present invention.
Figure 4B:
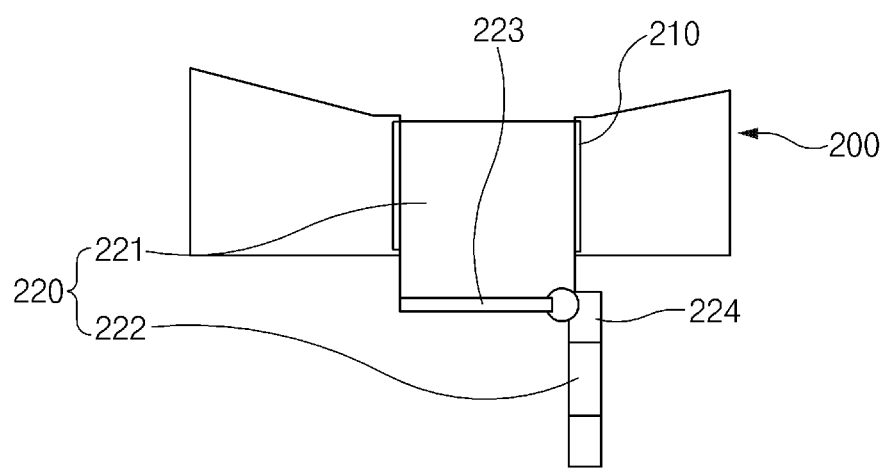

Meanwhile, as illustrated in FIGS. 1 and 4, an inner bottom of the drain tube 200 has a slope 211 of a predetermined angle toward the drain hole 210, thereby making it possible to easily discharge the condensate water through the hole cover part 220.

Figure 7:
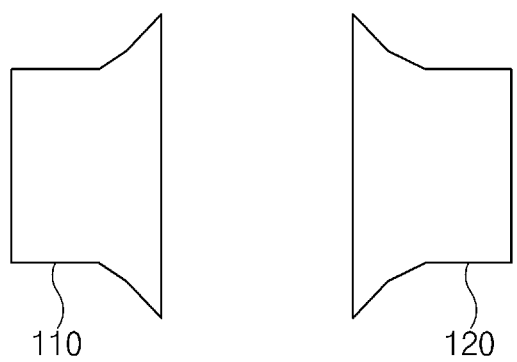
FIG. 7 is a schematic diagram showing a front end part and a rear end part of the muffler in the drain tube device of FIG. 1 according to the exemplary embodiment of the present invention.
Figure 8:
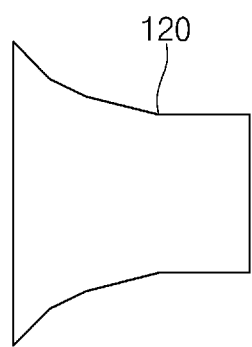
FIG. 8 is a schematic diagram showing a step formed in the rear end part of the muffler in the drain tube device of FIG. 1 according to the exemplary embodiment of the present invention.

In addition, as illustrated in FIGS. 7 and 8, in order to maximize a flow of the blower air in the muffler 100, it is preferred that a diameter of the rear end part 120 of the muffler 100 is formed to be greater than that of the front end part 110 thereof, and an exit side of the front end part 110 and an entrance side of the rear end part of the muffler 100 are multi-staged to form a step.

In particular, the present invention, which is arranged to effectively discharge the condensate water generated in the muffler 100, may allow the blower air to be easily discharged to the rear end part 120 of the muffler 100 by implementing an amount of hydrogen discharge of zero (i.e., substantially preventing hydrogen discharge), and not allowing pressure decrease in the muffler 100 to occur.

To this end, a pressure difference is effectively generated between the entrance and the exit by changing shapes of the front end part 110 and the rear end part 120 of the muffler 100, such that the blower air flows more smoothly, and the drain tube 200 maintains a suitable length in order to maintain a function of the muffler 100.

In addition, a sloped surface is formed around the drain hole of an inner side of the drain tube 200 to improve flowability of the condensate water, thereby making it possible to easily discharge the condensate water and maximize an effect of a changed structure of the drain hole 210 portion.

Meanwhile, the spring hinge plate 224 has the discharge hole 224H formed at the center thereof, when the discharge hole 224H has a structure which is sealed with the semipermeable membrane 222, and the semipermeable membrane 222 and the cover 221 maintain airtightness by the sealing part 223 formed of a silicon (or rubber) material.

In this case, a principle of discharging the condensate water according to the present invention is that the semipermeable membrane 222 included in the spring hinge plate 224 of the hole cover part 220 mounted in the drain hole 210 of the drain tube 200 does not pass hydrogen having small specific gravity and first passes the condensate water having large specific gravity. In this case, when an amount of water is small, the water is discharged through the semipermeable membrane 222, but when the RPM of the blower air is sharply increased such as at the time of starting the vehicle, since a large amount of condensate water is collected in the bottom of the hole cover part 220 in the muffler 100 during a short time, it is difficult to fully discharge the condensate water through the semipermeable membrane 222. Therefore, only the condensate water is discharged while the spring hinge plate 224 provided to be opened and closed is opened by a weight of the collected condensate water.

In addition, according to the present invention, by preventing a phenomenon in which the condensate water is condensed even in a below-zero temperature condition, an ice crystal may be discharged to the outside through an open and close structure of the spring hinge plate 224 formed in the hole cover part 220 in the case in which the ice crystal is generated, thereby making it possible to improve marketability.

Meanwhile, it is preferred that a size, a shape, and a structure of the spring hinge plate 224 may be changed together with the semipermeable membrane 222 depending on an amount of generated and discharged condensate water and durability characteristics.

As such, the drain tube device of a muffler for a fuel cell vehicle includes the muffler 100 included in the exhaust pipe of the fuel cell vehicle to reduce the noise, the muffler 100 having the front end part 110 to which the blower air is introduced and the rear end part 120 from which the blower air is discharged; the drain tube 200 having the drain hole 210 formed to be disposed between the front end part 110 and the rear end part 120 of the muffler 100 and downwardly discharge the blower air; and the hole cover part 220 mounted in the drain hole 210 to block the hydrogen discharge of the blower air and discharge only the condensate water. As a result, a global technical regulation (GTR) may be satisfied by maintaining a function of the muffler 100 while easily discharging the condensate water and smoothing the flow of the blower air through the hole cover part 220 mounted in the drain hole 210 of the muffler 100 at the time of starting the vehicle, which may increase marketability, prevent the phenomenon in which the condensate water is condensed even in the below zero temperature condition to rapidly discharge the ice crystal through the open and close structure of the hole cover part 220 even in the case in which the ice crystal is generated, and maximally suppress the hydrogen discharge.

As described above, according to the exemplary embodiments of the present invention, a global technical regulation (GTR) may be satisfied by maintaining a function of the muffler while easily discharging the condensate water and smoothing a flow of blower air through the hole cover part mounted in the drain hole of the muffler at the time of starting the vehicle to increase marketability, while preventing a phenomenon in which the condensate water is condensed even in the below zero temperature condition to rapidly discharge an ice crystal through the open and close structure of the hole cover part even in the case in which the ice crystal is generated, and maximally suppressing hydrogen discharge.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. A drain tube device of a muffler for a fuel cell vehicle, the drain tube device comprising:
   the muffler arranged in an exhaust pipe of the fuel cell vehicle to reduce noise, the muffler having a front end part to which blower air is introduced and a rear end part from which the blower air is discharged;
   a drain tube having a drain hole disposed between the front end part and the rear end part of the muffler so as to downwardly discharge the blower air; and
   a hole cover part configured to be mounted in the drain hole to block a hydrogen discharge of the blower air and discharge only condensate water,
   wherein the hole cover part further comprises:
   a cover of a pipe shape inserted into the drain hole and formed to downwardly protrude; and
   a semipermeable membrane provided in a lower portion of the cover to block the hydrogen discharge and to discharge only the condensate water.

2. The drain tube device according to claim 1, wherein the lower portion of the cover and the semipermeable membrane have a sealing part formed therebetween, the sealing part formed of a silicon material in order to maintain airtightness.

3. The drain tube device according to claim 1, wherein an inner bottom of the drain tube has a slope of a predetermined angle toward the drain hole so that the condensate water is discharged through the hole cover part.

4. The drain tube device according to claim 1, wherein a diameter of the rear end part of the muffler is greater than that of the front end part of the muffler in order to maximize a flow of the blower air in the muffler.

5. The drain tube device according to claim 4, wherein an exit side of the front end part and an entrance side of the rear end part of the muffler are multi-staged to form a step in order to maximize the flow of the blower air in the muffler.

6. The drain tube device according to claim 1, wherein a spring hinge plate is included in the lower portion of the cover, such that the spring hinge plate is opened together with the semipermeable membrane when revolutions per minute (RPM) of the blower air is increased, to allow the condensate water collected in the hole cover part to be discharged.

7. The drain tube device according to claim 6, wherein the spring hinge plate is automatically rotated by elastic force when the RPM of the blower air is decreased, to allow the lower portion of the cover to be closed.

8. The drain tube device according to claim 6, wherein a discharge hole for discharging the condensate water is formed at the center of the spring hinge plate.

9. The drain tube device according to claim 6, wherein a plurality of discharge holes are formed in the spring hinge plate for discharging the condensate water.

10. A drain tube device of a muffler for a fuel cell vehicle, the drain tube device comprising:
    a muffler arranged in an exhaust pipe of the fuel cell vehicle and configured to discharge blower air introduced into a front end part of the muffler to a rear end part of the muffler, the rear end part having a diameter greater than that of the front end part;
    a drain tube configured to connect the front end part and the rear end part of the muffler, the drain tube having a drain hole configured to downwardly discharge the blower air, and the drain tube having a slope of a predetermined angle toward the drain hole formed on an inner bottom of the drain tube; and
    a hole cover part configured to be mounted in the drain hole to block a hydrogen discharge of the blower air and discharge only condensate water,
    wherein the hole cover part includes:
    a cover of a pipe shape inserted into the drain hole and formed to downwardly protrude;
    a semipermeable membrane provided in a lower portion of the cover to block the hydrogen discharge and to discharge only the condensate water; and
    a spring hinge plate included in the lower portion of the cover, the spring hinge plate having a discharge hole, and the spring hinge plate being formed so as to be opened together with the semipermeable membrane when revolutions per minute (RPM) of the blower air is increased, to allow the condensate water collected in the hole cover part to be discharged.

* * * * *